United States Patent [19]

Tsushima et al.

[11] Patent Number: 4,541,157
[45] Date of Patent: Sep. 17, 1985

[54] METHOD OF PRODUCING SPLIT BEARING RINGS

[75] Inventors: Noriyuki Tsushima; Toshiharu Hirose, both of Kuwana, Japan

[73] Assignee: NTN Toyo Bearing Co., Ltd., Osaka, Japan

[21] Appl. No.: 58,939

[22] Filed: Jul. 19, 1979

Related U.S. Application Data

[63] Continuation-in-part of Ser. No. 795,279, May 9, 1977.

[30] Foreign Application Priority Data

Sep. 17, 1976 [JP] Japan ................................ 51-112047

[51] Int. Cl.⁴ ............................................... B21K 1/04
[52] U.S. Cl. ............................ 29/149.5 C; 29/149.5 R; 29/413; 29/414; 225/6; 225/7; 225/9; 384/569
[58] Field of Search ...................... 225/6, 7, 9; 29/149.5 DP, 149.5 C, 149.5 S, 149.5 R, 413, 414; 308/201 (U.S. only), 217 (U.S. only), 218, 216, DIG. 11

[56] References Cited

U.S. PATENT DOCUMENTS

| 821,322 | 5/1906 | Worrell | 308/216 X |
|---|---|---|---|
| 1,298,100 | 3/1919 | Royce | 29/149.5 R |
| 1,507,211 | 9/1924 | Shiley | 308/216 X |
| 1,967,821 | 7/1934 | Hess | 308/216 X |
| 2,016,924 | 10/1935 | Herrmann | 308/216 X |

FOREIGN PATENT DOCUMENTS

| 438685 | 5/1912 | France | 308/216 |
|---|---|---|---|
| 231312 | 6/1944 | Switzerland | 29/149.5 R |
| 417774 | 10/1934 | United Kingdom | 29/148.4 |
| 804392 | 11/1958 | United Kingdom | 29/149.5 R |

Primary Examiner—Francis S. Husar
Assistant Examiner—V. K. Rising
Attorney, Agent, or Firm—Armstrong, Nikaido, Marmelstein & Kubovcik

[57] ABSTRACT

A method of splitting bearing rings in a direction obliquely crossing their axes. This method comprises forming a notch of substantially V-shaped cross-section in the inner or outer peripheral surface of a bearing ring obliquely or in a V-direction, or forming a notch of substantially V-shaped cross-section in an end surface of a bearing ring at a predetermined angle with respect to the surface, heat-treating the bearing ring, and exerting wedge stress along the notch by a wedge type press-breaking tool.

4 Claims, 26 Drawing Figures

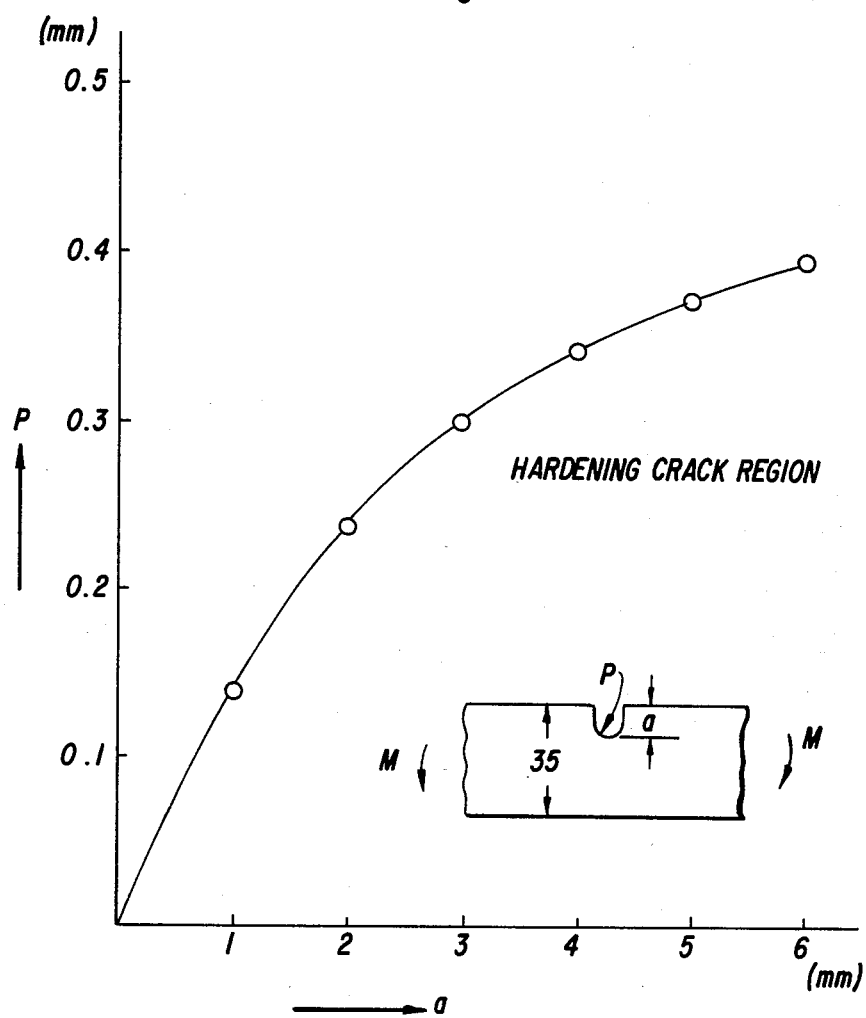

METHOD OF PRODUCING SPLIT BEARING RINGS

This application is a continuation-in-part application of earlier filed, copending application, Ser. No. 795,279, filed May 9, 1977.

BACKGROUND OF THE INVENTION

1. Field of the Invention

The present invention relates to a method of producing split bearing rings and, more particularly, it relates to a method of splitting bearing rings in a direction obliquely crossing their axes by exerting wedge stress in a notch of substantially V-shaped cross-section formed in a peripheral or end surface of a bearing ring.

2. Description of the Prior Art

Generally, in a split bearing ring, splitting is effected by forming a notch in an end surface or inner peripheral surface of a bearing ring to be split, and then applying a ring press-breaking method using a press. According to this conventional method, since it is difficult to split a ring obliquely or in a V-form at a predetermined angle with respect to the axis of the ring (oblique splitting), in the case of a thin-walled article, it is usual practice to form a notch in the inner peripheral surface or an end surface and split the ring axially (parallel splitting) by pressing it in a direction crossing the notch at right angles. However, in the case of a thick-walled article, splitting is effected usually by turning. With this method by turning, however, although oblique splitting is possible by separately producing two rings, each having an end surface inclined with respect to the axis by turning, the yield of material is low. Thus, the method is disadvantageous from the standpoint of productivity.

In addition, in splitting bearing rings, oblique splitting may be said to be the most desirable splitting method in light of the following conditions:

The split line resulting from oblique splitting crosses the major axis of the contact ellipse at an angle on the bearing rolling surface and the contact surface contacts only a portion of the split line with respect to line contact or similar rolling contact, so that stress concentration at the split region can be greatly reduced, resulting in remarkable improvement of the life of the bearing.

SUMMARY OF THE INVENTION

Accordingly, the present invention has been developed in view of the above problems encountered in producing split bearing rings and has for its object the provision of a method of producing split bearing rings which is capable of splitting rings in any desired direction and provides a high yield of material and high productivity.

According to a feature of the present invention, the inner or outer peripheral surface of a bearing ring is formed with a notch which extends obliquely or in a V-form and, after the ring is heat-treated or further ground, wedge stress is exerted along the notch by wedge type press-breaking means, thereby splitting the ring in a direction obliquely crossing the axis thereof.

According to a second feature of the invention, an end surface of a bearing ring is formed with a notch of substantially V-shaped cross-section at a predetermined angle with respect to the end surface and, after the ring is heat-treated or further ground, wedge stress is exerted in the notch by wedge type pressure-breaking means with an edge having a greater angle than the notch angle, thereby splitting the ring obliquely of the axis thereof.

Still another feature of the present invention is that the notch in the bearing ring is made in a surface thereof which does not act as a bearing surface.

These and other features of the invention will become apparent as the description proceeds, when considered with the accompanying drawings illustrating embodiments of the invention.

BRIEF DESCRIPTION OF THE DRAWINGS

FIGS. 1–11 show a first embodiment of the invention wherein a peripheral surface of a bearing ring is formed with a notch.

FIG. 1 is a perspective view of a bearing ring formed with an obliquely extending notch.

FIG. 2 shows how to split the bearing ring shown in FIG. 1.

FIG. 3 is a perspective view of a bearing ring formed with a notch extending in a V-form.

FIG. 4 is an enlarged plan view of the principal portion of the bearing ring shown in FIG. 3.

FIG. 5 is a schematic view showing how tensile stress acts in a flat plate according to a wedge type pressure-breaking method.

FIG. 6 is a graph showing variations of $F(a/b)/\sqrt{a}$ relative to a notch depth a.

FIG. 7 is a graph showing variations of $K_1$ relative to a notch angle $\alpha$.

FIG. 8 is a schematic view showing the relation between a crack and a hole formed in a bearing ring.

FIG. 9 is a schematic view showing an instant when the crack reaches the hole.

FIG. 10 is a graph showing a region for a notch bottom curvature $\rho$ where no quenching crack occurs with respect to a notch depth a.

FIG. 11 is a schematic view showing the relation of a wedge angle $2\theta$ relative to a notch angle $2\phi$.

FIGS. 12 and 14 are perspective views of bearing rings to be split.

FIGS. 13 and 15 show how to split the bearing rings shown in FIGS. 12 and 14, respectively.

FIGS. 16 and 20 are perspective view of bearing rings to be split in a V-direction. FIG. 17 is an enlarged front view of the principal portion of the bearing ring shown in FIG. 16.

FIGS. 18 and 19 are schematic views showing how to split the bearing ring shown in FIG. 16.

FIG. 21 is an enlarged front view of the principal portion of the bearing rings shown in FIG. 20.

FIG. 22 is a schematic view showing stress acting in a flat plate according to a wedge type pressure-breaking method.

FIG. 23 is a graph showing the relation between a notch depth a and breaking stress.

FIG. 24 is a graph showing the relation between a notch depth a and notch bottom curvature.

FIG. 25 is a schematic view showing the relation between a wedge shape and a wedge angle.

FIG. 26 is a side viewing showing bearing and bearing ring of the present invention.

DESCRIPTION OF THE PREFERRED EMBODIMENTS

First, an embodiment of the invention wherein a peripheral surface of a bearing ring is formed with a notch will be described.

Figure 1:
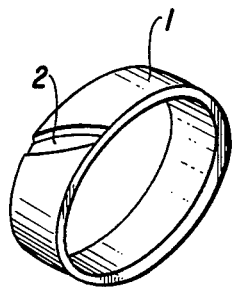
Figure 2:
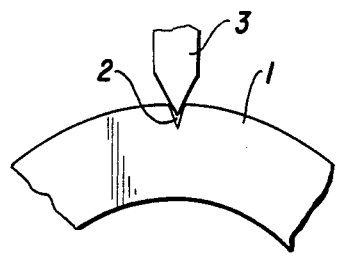

Referring to FIG. 1 showing a first embodiment of the invention, a bearing ring to be split is designated at 1 and the outer peripheral surface thereof is formed with a notch 2 of substantially V-shaped cross-section. As shown in FIG. 2, the bearing ring 1 is split by wedge type pressure-breaking means 3 along the notch, i.e., in a direction obliquely crossing the axis. In this connection, it is to be noted that the compressive load necessary for splitting an outer diameter 108.5$\phi$ × inner diameter 85$\phi$ × width 41 mm ring was about 6 tons.

Figure 3:
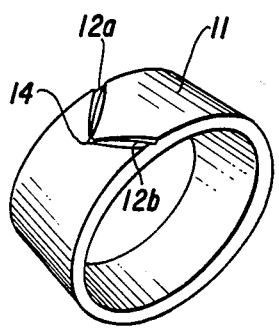
Figure 4:
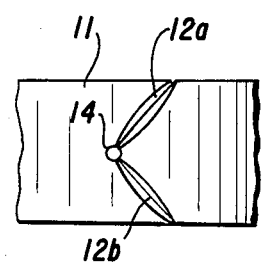

In the case of splitting in a V-direction, as shown in FIGS. 3 and 4, a small hole 14 is centrally formed in the outer peripheral surface of a bearing ring 11 and notches 12a and 12b are formed in a V-form with said small hole 14 located at the crossing point of the V. The material, after being heat-treated and ground, is broken along one notch 12a and then along the other notch 12b by wedge type pressure-breaking means, whereby it is split along the split line obliquely crossing its axis.

Figure 5:
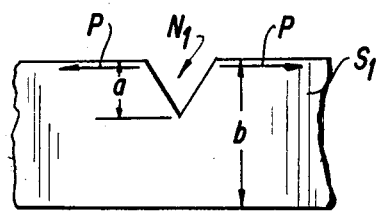
Figure 6:
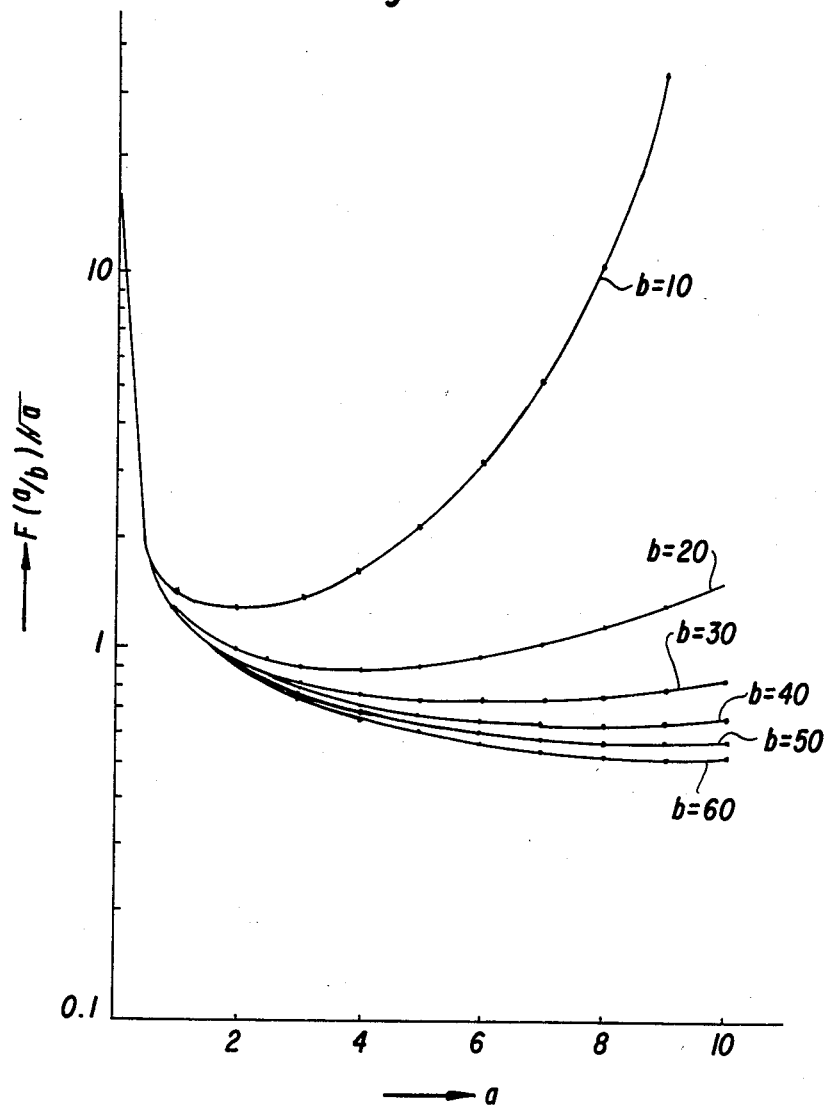

The conditions of the stress exerted by the wedge type pressure-breaking means 3 in the notch 2 or notches 12a and 12b are as follows:

If an approximation to the stress conditions of such bearing ring is made by taking a flat plate S1 shown in FIG. 5 as an example, with the wedge stress represented by P, the stress $\sigma$ max in the bottom of a notch N1 is given by the following equations:

$$\sigma \max = \frac{2K}{\sqrt{\pi\rho}} \tag{1}$$

$$K = \frac{2p}{\sqrt{\pi a}} \cdot F(a/b) \tag{2}$$

$$\sigma \max = \frac{4p}{\pi\sqrt{\rho}} \cdot \frac{F(a/b)}{a} \tag{3}$$

$$F(a/b) = \frac{3.52}{(1-a/b)^{3/2}} - \frac{4.35}{(1-a/b)} + 2.13(1-a/b) \tag{4}$$

wherein:
$\rho$ = the curvature of the front end of the notch;
K = stress intensity factor;
F(a/b) = compensation factor;
a = notch depth
b = plate thickness $F(a/b)/\sqrt{a}$ varies according to the notch depth a, as shown in FIG. 6. In the equation (3), with $\rho$ taken as being constant if $\sigma$ max as breaking stress is uniquely determined by the material, then as $F(a/b)/\sqrt{a}$ increases, P decreases. That is, breaking stress decreases. Therefore, the smaller the notch depth a, the greater the advance. Further, the relation between compressive stress W and wedge stress P depennds on wedge angle 2$\theta$ and is expressed by the following equation:

$$P = (W/2) \cot \theta$$

Therefore, the smaller the wedge angle, the greater the advantage. However, the wedge angle should be greater than the notch angle. If the breaking stress at the bearing end is 180 kg/mm², the stress intensity factor Kc of the front end of the crack at the time of crack occurrence is given as follows:

From the equation (1), $$Kc = \frac{180\sqrt{\pi\rho}}{2} \tag{5}$$

From the equation (2), $$Kc = \frac{2pc}{\sqrt{\pi ac}} Fc(a/b) \tag{6}$$

On the other hand, the K for the front end of the crack when the crack propagates is given as follows:

From the equations (1)–(6), $$k = 90\sqrt{\pi\rho} \; \frac{\sqrt{ac}\; F(a/b)}{\sqrt{a}\; Fc(a/b)}$$

In a practical range (b = 10–60, a = 1–3), as seen from FIG. 6, $$\frac{\sqrt{ac}\; F(a/b)}{\sqrt{a}\; Fc(a/b)} > 0.5$$

Therefore, $$K \geq 90\sqrt{\pi\rho} \times 0.5 \tag{7}$$

Figure 8:
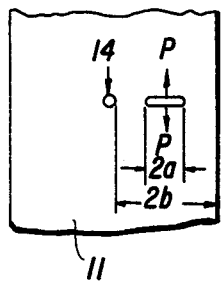

If the KIC of of bearing steel is 50 kg$\sqrt{mm}$/mm², then from K > KIC = 50, for $\rho$ > 0.4 mm, it is seen that breakage occurs at once after a crack occurs in the notch. In addition, if the product hardness decreases, the KIC value increases, making breakage more difficult. Therefore, the product hardness $H_{RC}$ should suitably be not less than 50. Practical ranges for (I) crack stopping hole diameter 2r, (II) notch bottom curvature $\rho$, (III) wedge angle 2$\theta$, (IV) notch shape 2$\phi$ and (V) notch angle $\alpha$ are as follows:

(I) Crack stopping hole diameter 2r:

When breakage occurs in a V-form, the essential condition is that the crack should stop at the central hole 14 shown in FIGS. 3 and 4. Therefore, if the radius of the hole 14 is r, with an assumption made as shown in FIG. 8, the intensity factor K of the front end of the crack when the latter propagates is given as follows:

$$K = \frac{P}{\sqrt{\pi a}} F(a/b) \tag{2'}$$

When the crack reaches the hole 14, the stress $\sigma$ max in the inner periphery of the hole is as follows:

$$\sigma \max = \frac{2K}{\sqrt{\pi r}} \tag{1'}$$

If the initial notch curvature is $\rho$, then $$K = \pi\sqrt{\pi\rho} \cdot \frac{\sqrt{ac}}{\sqrt{a}} \cdot \frac{F}{Fc} \tag{8}$$

In a practical range, (b = 10–60, ac = 1–3), $$\frac{\sqrt{ac}}{Fc} = 1.4 - 0.7.$$

When the crack reaches the hole 14, if the hole position is at the middle of the ring and a/b=0.5, then from the equation (4):

$$F(a/b) = 4.87.$$

$$K = 90\sqrt{\pi \rho} \cdot \frac{\sqrt{ac}}{Fc} \times \frac{4.87}{\sqrt{a}} > 90\sqrt{\pi \rho} \times 0.7 \times \frac{4.87}{\sqrt{a}}$$

When considered under the condition that it should not break at once after the crack occurs ($\rho < 0.4$), $$K > 90\sqrt{\pi \times 0.4} \times 0.7 \times \frac{4.87}{\sqrt{a}} = \frac{344}{\sqrt{a}} \quad (9)$$

Figure 9:
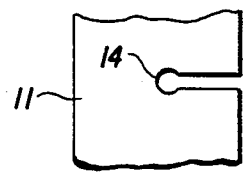

At an instance when the crack reaches the hole 14, the condition shown in FIG. 9 is established and the intensity factor of the hole approximately doubles (Equation (2') changes to the equation (2)).
Therefore:

$$K > 2 \times \frac{344}{\sqrt{a}}.$$

From the equation (1), $$\sqrt{\pi r} = \frac{2K}{\sigma \max} \cdot \frac{2 \times 2 \frac{344}{\sqrt{a}}}{180} = \frac{\frac{344}{45}}{\sqrt{a}}.$$

$$\therefore r > \frac{18.6}{a}.$$

Thus, when the ring width is 18.6×4, the essential condition for the crack to stop at the hole is that the radius r of the hole is r>1. When breakage occurs at once, $\rho > 0.4$. It is seen that r increases with $\rho$. Since it is desirable that the hole diameter 2r be small from the standpoint of the rolling life, it is desirable that the notch bottom curvature $\rho$ be small. Suitably, the notch bottom curvature $\rho$ should be not more than 0.4. However, if the notch bottom curvature $\rho$ is too small, there is a possibility that a hardening crack will occur during heat treatment. Therefore, it is necessary to set a lower limit to the notch bottom curvature $\rho$ and this will now be described.

(II) Notch bottom curvature $\rho$:

Assuming that the stress acting on a bearing material upon occurrence of a quenching crack is not less than 30 kg/mm² and that the heat treatment stress is not more than +5 Kg/mm², the shape factor Kt is within the range Kt<6 and no hardening crack will occur. This is taken as the notch bottom curvature $\rho$ region for prevention of quenching crack relative to the notch depth a and is shown in FIG. 10. If the notch bottom curvature $\rho$ is 0.4 mm, it follows that the notch depth a is allowed to have a value of up to 6 mm.

Figure 11:
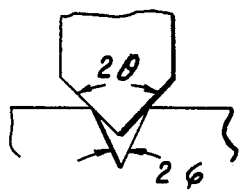

(III) Wedge angle 2θ:

The angle defined by the converging leading edges of the wedge is the wedge angle 2θ which is illustrated in FIG. 11. Reduction of the wedge angle 2θ is desirable since this reduces breaking load, but 20°<2θ=60° is suitable from the standpoint of the strength of the wedge. In addition, the hardness of the wedge is, of course, higher than that of the product.

(IV) Notch shape 2φ:

As shown in FIG. 11, 2φ<2θ. Since the bearing and wedge will be deformed when subjected to wedge stress, it is necessary that there be a substantial difference between the angles φ and θ. The condition 2θ−2φ>20° is sufficient for ordinary bearing rings, though not necessarily definite since the size of wedge stress is influenced by the hardness of material. Therefore, 2θ−2φ is suitably 0°-20°. The notch depth a varies with the wall thickness, etc., and the greater the notch depth, the more advantageous to splitting, but when splitting operation is considered, 3≦a≦10 is suitable.

Figure 7:
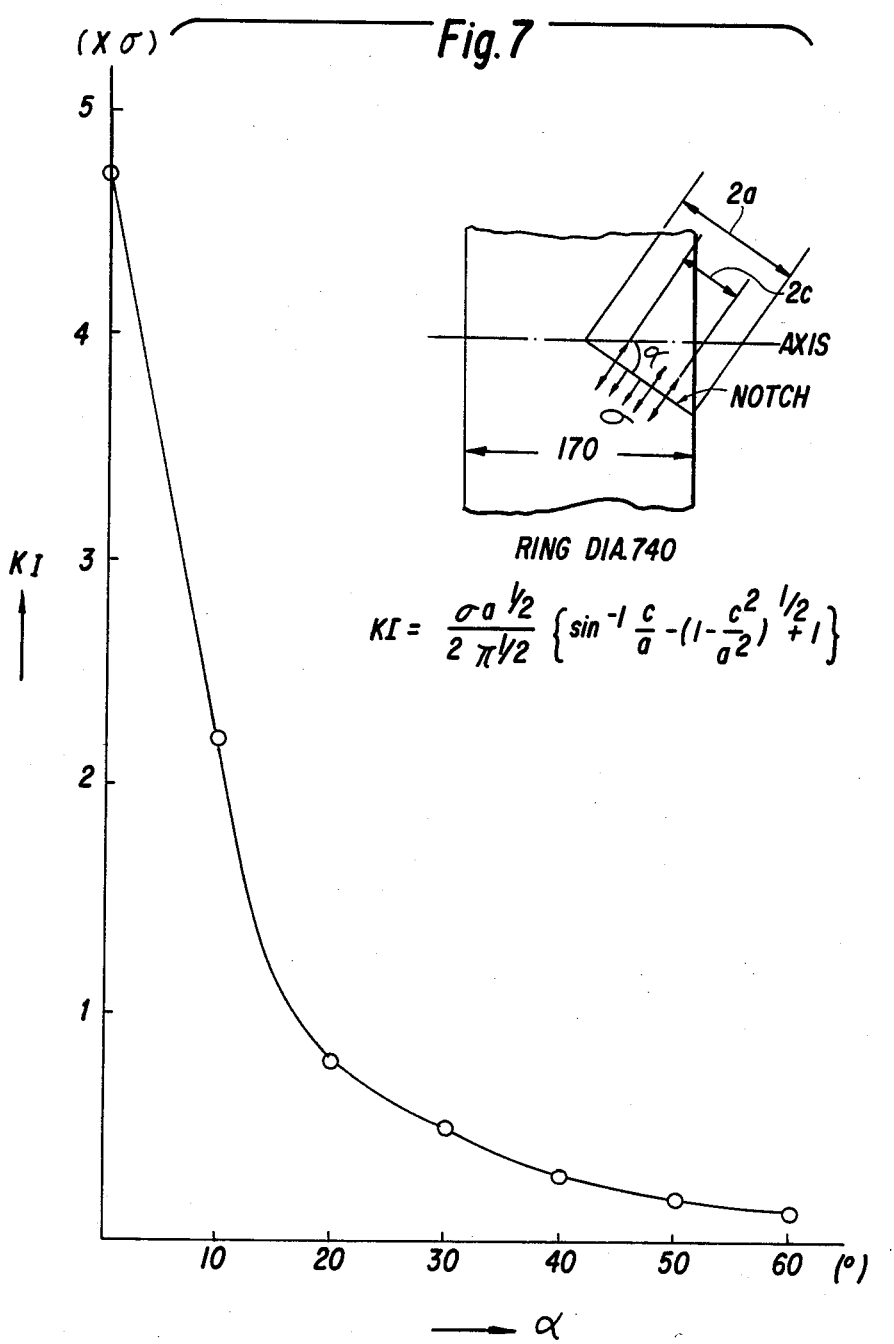

(V) Notch angle α:

When splitting is effected simply with an angle α with respect to the axis, the stress intensity factor K of the front end of a crack varies with respect to α as shown in FIG. 7. The smaller α, the better since the breaking load is reduced. However, if the angle α is large, the stress concentration caused by rolling contact is high. Therefore, the angle α should be determined with consideration given to these two conditions. The stress concentration caused by rolling contact is also influenced by the curvature of the race and rolling bodies, and α should be determined with this point taken into account. That the breaking load at the time of splitting is high is not so serious a problem with regard to the production of bearings since α is suitably 10°-30°.

As has been noted above, the first feature of the present invention lies in forming a notch in the inner or outer diameter of a bearing ring obliquely or in a V-form, heat-treating and grinding the ring, and exerting wedge stress along the notch by wedge type pressure-breaking means having an edge of larger angle than the notch, thereby obliquely splitting the bearing ring. Therefore, bearing rings can be easily split in any desired direction and the yield and productivity are high. More particularly, since the breaking load required when a wedge is used is little influenced by the wall thickness, though influenced by the notch bottom curvature, this method is very effective even in the case of thick-walled articles. Further, even in the case of a bearing ring which does not need to be split at an angle with respect to its axis, the use of wedge stress for breaking with a notch formed in an end surface for receiving a wedge is advantageous over the conventional ring breaking procedure. Moreover, the arrangement is simple as well as being advantageous.

II. Next, another embodiment of the invention in which an end surface of a bearing ring is formed with a notch will be described.

Figure 12:
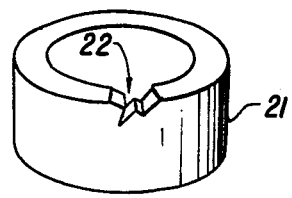
FIGS. 12–26 show a second embodiment of the invention wherein an end surface of a bearing ring is formed with a notch.
Figure 13:
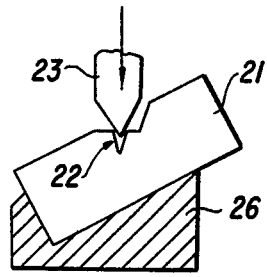

A bearing ring 21 shown in FIG. 12 is formed with a notch 22 of substantially V-shaped cross-section for splitting purposes. As shown in FIG. 13, it is placed on a support 26 at a predetermined angle and wedge stress is exerted along the notch 22 by a wedge type pressure-breaking means 23, whereby the bearing ring is split in a direction obliquely crossing its axis. In this connection, the compressive load required for splitting an outer diameter 200φ×inner diameter 160φ×100 mm width 100 mm ring was about 13 tons.

Figure 14:
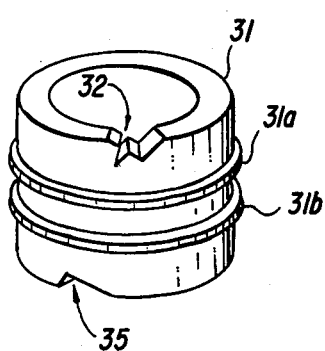
Figure 15:
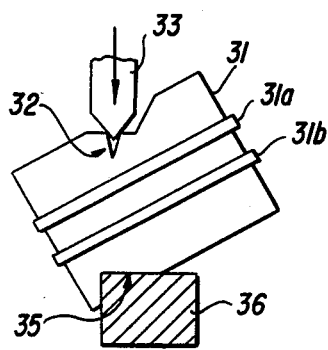

A bearing ring 31 shown in FIG. 14 has annular flanges 31a and 31b around its outer periphery. One end surface of the bearing ring 31 is formed with a notch of substantially V-shaped cross-section for splitting purposes, while the other end surface is formed with a support surface 35 at right angles with the load line so that the ring 31 may be supported with the notch 32 vertically positioned. Therefore, the bearing ring 31, supported at its support surface 35 on the support 36 as shown in FIG. 15, will be split by the wedge type pressure-breaking means 35 in a direction obliquely crossing the axis.

In this way, when oblique splitting is to be effected along the notch formed in the end surface, not only the bearing ring 21, whose inner and outer diameters are straight, but also the bearing ring 31 having flanges on its outer periphery can be simply split and that with high precision.

Figure 16:
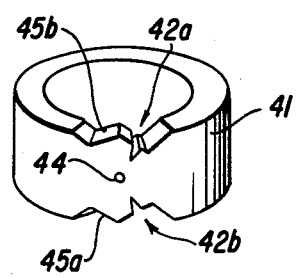
Figure 17:
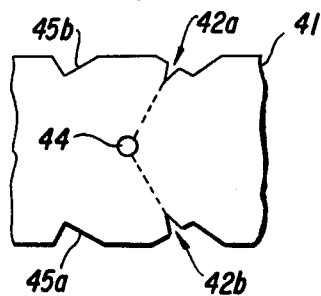
Figure 19:
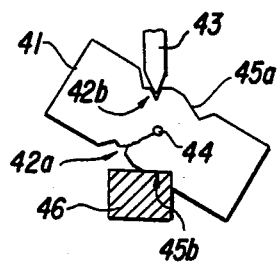
Figure 18:
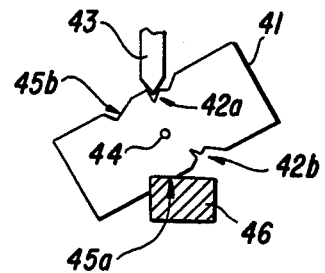

In the case of splitting in a V-direction, as shown in FIGS. 16 and 17, a bearing ring 41 to be split is formed with a small hole 44 centrally of the width of its peripheral surface and the opposite end surfaces of the ring 41 are formed with notches 42a and 42b of V-shaped cross-section with their bottoms directed toward the small hole 44. In other words, the small hole 44 is located at the intersection of the directions of propagation of the two notches. Further, the end surfaces are formed with support surfaces 45a and 45b so that the ring 41 may be supported against a load applied in the direction of the notch 45a or 45b. In splitting operation, as shown in FIGS. 18 and 19, the bearing 41, after being heat-treated and ground, is positioned at its one support surface 45a on the support 46 and subjected to wedge stress, causing the notch 42a to propagate to the small hole 44, whereupon the ring is turned upside down and positioned at its other support surface 45b on the support 46 and, similarly, the notch 42b is caused to propagate to the small hole 44. As a result, the bearing ring 41 is split in a direction obliquely crossing its axis along the V-form split line. In addition, in splitting operation, if a pin for prevention of deformation of the small hole during loading is inserted in the small hole 44, splitting can be facilitated.

Figure 20:
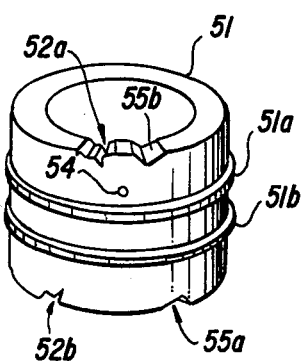
Figure 21:
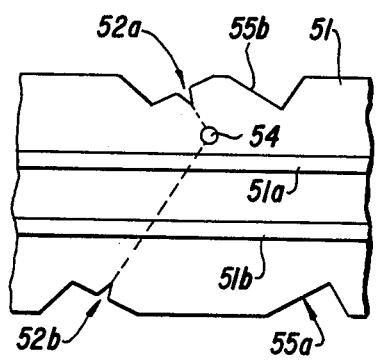

FIGS. 20 and 21 show the arrangement of notches 52a and 52b and a small hole 54 formed in a bearing ring 51 which is to be split in a V-direction and which has annular flanges 51a and 51b, it being understood that if the small hole were located on the rolling surface, troubles would be caused. Thus, the small hole 54 is located to avoid the rolling surface, and the notches 52a and 52b of V-shaped cross-section are formed in the end surfaces of the ring 51 in such a manner that the notch bottoms are directed toward the small hole 54. The opposite end surfaces are further formed with support faces 55a and 55b vertically with respect to the load lines so that the ring 51 may be effectively supported against a load applied in a direction of the notch 52a or 52b. The splitting operation for the bearing ring 51 is the same as for the previous ring 41.

Figure 22:
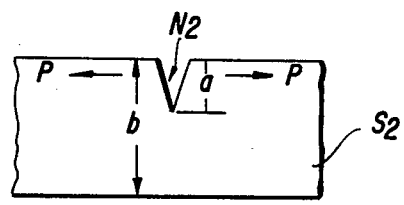
Figure 25:
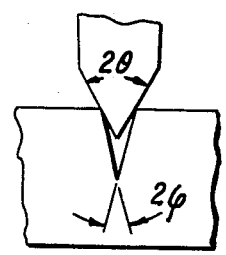

The stress conditions established by wedge type pressure-breaking means 22, 33 and 43 in the notches 22, 32, 42a and 42b, and 52a and 52b in the bearing rings 21, 31, 41 and 51, respectively, are as follows:

First of all, the stress conditions in a flat plate S2 shown in FIG. 22 will be taken as an example and used to make an approximation to the stress conditions in a bearing ring. With wedge stress represented by P, as in the case of the previous notch N1 formed in the peripheral surface, the stress $\sigma$ max in the notch bottom is given by the following equations:

$$\sigma \max = \frac{2K}{\sqrt{\pi \rho}}$$

$$K = \frac{2P}{\sqrt{\pi a}} \times F(a/b)$$

$$\sigma \max = \frac{4P}{\pi \sqrt{\rho}} \times \frac{F(a/b)}{\sqrt{a}}$$

$$F(a/b) = \frac{3.52}{(1-a/b)^{3/2}} - \frac{4.35}{(1-a/b)^{\frac{1}{2}}} + 2.13(1-a/b)$$

where
$\rho$ = the curvature of front end of notch;
K = stress intensity factor;
F(a/b) = compensation factor.

Figure 23:
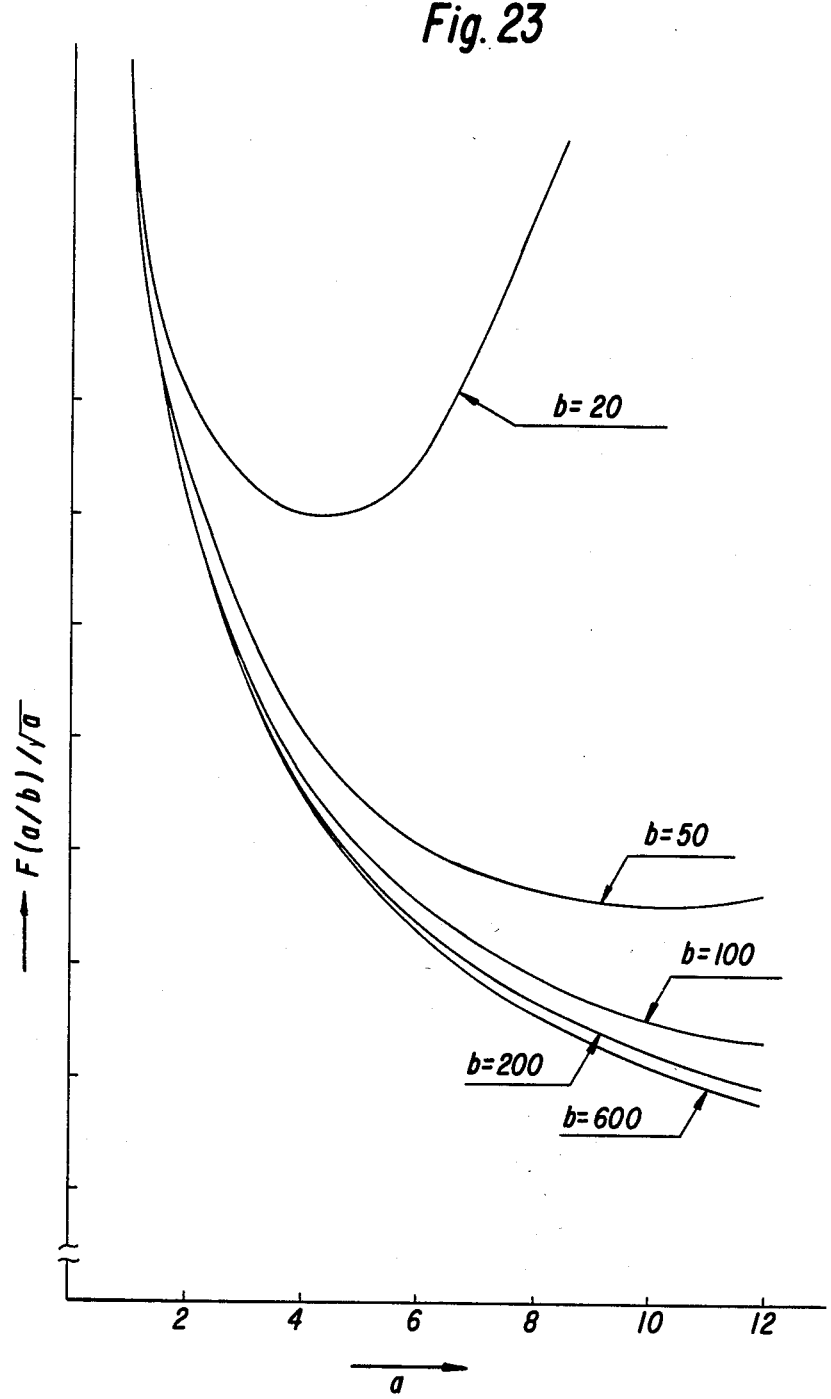
Figure 24:
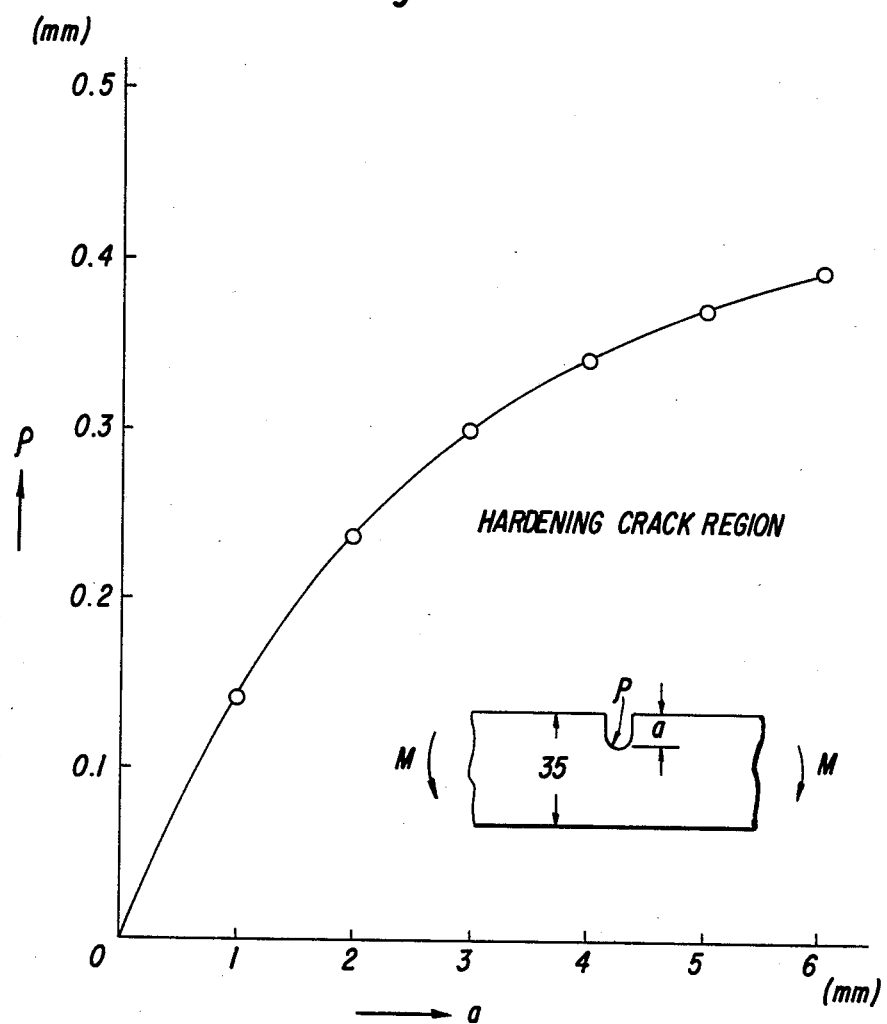

$F(a/b)/\sqrt{a}$ varies with the notch depth a, as shown in FIG. 23. If $\rho$ in the equation (3) is constant and $\sigma$ max as the breaking stress is uniquely determined by the material, then as $F/\sqrt{a}$ increases, P decreases. Therefore, the smaller the notch depth a, the greater the breaking load $\sigma$ max and the more advantageous. The relation between compressive load W and the wedge stress P depends upon wedge angle $2\theta$ and is expressed by the equation $P=(W/2)\cot\theta$. Therefore, the smaller the wedge angle $2\theta$, the more advantageous. However, the wedge angle should always be greater than the notch angle.

If the breaking stress is 180 kg/mm², then the stress intensity factor Kc for the front end of a crack when the latter occurs is as follows:

From equation (1), $$Kc = \frac{180\sqrt{\pi\rho}}{2} = 90 \qquad (5)$$

From equation (2), $$Kc = \frac{2Pc}{ac} Fc(a/b) \qquad (6)$$

On the other hand, the K for the front end of a crack when the latter propagates is as follows:

From equations (1)–(6), $$90\sqrt{\pi\rho} \quad \frac{\sqrt{ac}\ F(a/b)}{\sqrt{a}\ Fc(a/b)}$$

For the range b=50–600 and a=2–12, as seen from FIG. 12:

$$\frac{\sqrt{ac}\ F(a/b)}{\sqrt{a}\ Fc(a/b)} > 0.4.$$

Therefore, $K < 90\sqrt{\pi\rho} \times 0.4$.
If the KIC of bearing steel is 50 Kg$\sqrt{mm}$/mm², from K>KIC=50 in the equation (7), it is seen that for $\rho>0.6$ mm, the bearing steel will be broken at once after a crack occurs in the notch.

In addition, practical ranges for (I) small hole diameter 2r, (II) notch bottom curvature $\rho$, (III) wedge angle $2\theta$, and (VI) notch shape $2\rho$ are as follows:
(I) small-hole diameter 2r:

When a bearing ring is to be split in a V-form, the essential condition is that the crack from one of the notches should stop at the small hole. Therefore, with the radius of the small hole represented by r, when the crack reaches the small hole, the stress $\sigma$ max in the inner periphery of the small hole is as follows:

$$\max = \frac{2K}{\sqrt{\pi \rho}} \quad (1')$$

When the initial notch bottom curvature is represented by $\rho$, $$K = 90\sqrt{\pi \rho} \cdot \frac{\sqrt{ac}}{\sqrt{a}} \cdot \frac{F}{Fc} \quad (8)$$

For practical range, (b=50–600 and a=2–12), $$\frac{\sqrt{ac}}{Fc} = 0.95 - 0.4.$$

When the crack reaches the small hole, if a/b=0.5 with the small hole located at the middle of the ring end surface, then from the equation (4), $F(a/b)=4.87$.

Substituting this in the equation (8) gives:

$$K = 90\sqrt{\pi \rho} \cdot \frac{ac}{Fc} \times \frac{4.87}{\sqrt{a}} > 90\sqrt{\pi \rho} \times 0.4 \times \frac{4.87}{\sqrt{a}}$$

When considered under the condition that breakage should not occur at once after a crack occurs ($\rho < 0.6$), then:

$$K > 90\sqrt{\pi \times 0.6} \times 0.4 \times \frac{4.87}{\sqrt{a}} = \frac{241}{\sqrt{a}} \quad (9)$$

From the equations (1') and (9'):

$$\sqrt{\pi} = \frac{2K}{\sigma \max} \cdot \frac{2 \times \frac{241}{\sqrt{a}}}{180} = \frac{2.7}{\sqrt{a}}$$

$$\therefore r > 2.28/a$$

Thus, when a is 228, the essential condition for the crack to stop at the small hole is that the radius r of the small hole is not less than 1 mm. In order for breakage to occur at once, $\rho \geq 0.6$. It is seen that r increases with $\rho$. Since it is desirable that the hole diameter 2r may be small from the standpoint of the rolling life, it is desirable that the notch bottom curvature $\rho$ be small. Therefore, suitably, the notch bottom curvature $\rho$ should not be more than 0.6. If, however, the notch bottom curvature $\rho$ is too small, there is a possibility that a hardening crack will occur during heat treatment. Therefore, it is necessary to set a lower limit to the notch bottom curvature $\rho$.

(II) notch bottom curvature $\rho$:

Assuming that the stress acting on a bearing material upon occurrence of a quenching crack is not less than 30 Kg/mm², and that the heat treatment stress is not more than +5 Kg/mm², the notch shape factor Kt is within the range Kt<6 and no quenching crack will occur. This is taken as the notch bottom curvature $\rho$ region for prevention of quenching crack relative to the notch depth a and is shown in a graph in FIG. 13. According to this graph, if the notch bottom curvature $\rho$ is 0.4, it is seen that the notch depth a is allowed to have a value of up to 6 mm.

(III) Wedge angle $2\theta$:

Reduction of the wedge angle $2\theta$ is desirable since this reduces breaking load, but $20° \leq 2\theta \leq 60°$ is considered suitable from the standpoint of the strength of the wedge.

(IV) notch shape $2\phi$:

As shown in FIG. 14, the relation between wedge angle $2\theta$ and notch shape $2\phi$ is always such that $2\phi > 2\theta$. Since the bearing and the wedge will deform when subjected to wedge stress, it is necessary that there be a substantial difference between the angles $\phi$ and $\theta$. The condition $2\theta - 2\phi > 20°$ is sufficient for ordinary bearing rings, though not necessarily definite since the size of the wedge stress is influenced by the hardness of the material.

The formation of notches 2, 12, 23, 24 and 33,34 in bearing rings 1, 11, 21 and 31 to satisfy the above conditions and the application of wedge type pressure-breaking means will facilitate splitting.

As has been described, the second feature of the present invention lies in forming a substantially V-shaped notch in an end surface of a bearing ring at a predetermined angle with respect to the surface, heat-treating and grinding the ring, and exerting wedge stress by wedge type pressure-breaking means having an edge of larger angle than the notch, thereby splitting the bearing ring in an oblique direction or V-direction. According to this method, bearing rings can be easily split in any desired direction without being influenced by the shapes of the inner and outer diameters. The yield and productivity are high. Further, loading a bearing ring at its end surface allows the use of a small size pressing device regardless of the size of the outer diameter of the bearing ring. The merits in practical use are very great.

While there have been described what are, at present, considered to be the preferred embodiments of the several features of the invention, it will be obvious to those skilled in the art that modifications and changes may be made without departing from the essence of the invention.

Figure 26:
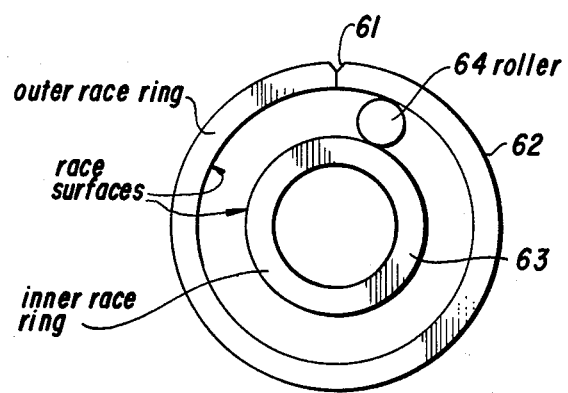

As shown in FIG. 26, notch 61 in bearing ring 62 is made in the surface of the ring, which is opposite to the surface 63 which acts as a race for roller bearing 64. Since the notch 61 is in the surface which is opposite to the race surface, the rolling element 64 does not contact the surface having the notch therein. This, in combination with the oblique direction of the notch, greatly reduces the stress concentration of the split region. Furthermore, vibration, pitting, etc. are reduced.

It is, therefore, to be understood that the exemplary embodiments thereof are illustrative and not restrictive of the invention, the scope of which is defined in the appended claims and that all modifications that come within the meaning and range of equivalency of the claims are intended to be included therein.

What is claimed:

1. A method of producing a metal split bearing ring, said method comprising:

(a) forming a notch in one of the edge surfaces of said ring, said notch including at least a first portion having a V-shaped cross-section, wherein the axis bisecting the angle of the V is at an oblique direction with the axis of said ring;
  (b) heat treating said metal ring to harden said metal ring to a hardness $H_{RC} \geqq 50$;
  (c) applying a wedge stress along said notch using a wedge type pressure-breaking means having a wedge angle, wherein the angle of the wedge of the breaking means is between 20° and 60° and is greater than the angle of the V-shaped cross-section of said notch, whereby said ring is split along said notch.

2. A method of producing a split metal bearing ring as set forth in claim 1 including forming said notch with a second portion in the edge surface of said ring, said second portion having a V-shaped cross-section, said first portion being formed in one of the legs of the V of the second portion.

3. A method of producing a split metal bearing ring, said method comprising:
  (a) forming a first notch in one of the edge surfaces of said ring, said notch including at least a first portion having a V-shaped cross-section, wherein the axis bisecting the angle of the V is at an oblique direction with the axis of said ring;
  (b) forming a second notch in the other edge surface of the ring, said second notch including at least a first portion having a V-shaped cross-section, wherein the axis bisecting the angle of the V is at second oblique direction with the axis of said ring and wherein the axis bisecting the V's of the first and second notches intersect at a point on the peripheral surface of the ring between the edges of said ring;
  (c) forming a crack stopping hole through the peripheral surfaces of said ring at the point where the axes of the V's intersect;
  (d) heat treating said ring;
  (e) applying a wedge stress along said notches using a wedge type pressure breaking means, wherein the angle of the wedge of the breaking means is greater than the angle of the V-shaped cross-section of said notches, whereby said ring is split along said notches stopping at said crack stopping hole.

4. A method of producing a split metal bearing as set forth in claim 3 including forming said first and second notches with a second portion in the edge surface of said ring, said second portion having a V-shaped cross-section, said first portion being formed in one of the legs of the V of the second portion.

* * * * *